US008538568B2

(12) United States Patent
Chen et al.

(10) Patent No.: US 8,538,568 B2
(45) Date of Patent: Sep. 17, 2013

(54) AUDIO DATA TRANSMITTING APPARATUS FOR WEBCASTING AND AUDIO REGULATING METHODS THEREFOR

(75) Inventors: Po-Wen Chen, Tainan County (TW); Chin-Yi Lin, Yunlin County (TW)

(73) Assignee: Realtek Semiconductor Corp., Hsinchu (TW)

( * ) Notice: Subject to any disclaimer, the term of this patent is extended or adjusted under 35 U.S.C. 154(b) by 259 days.

(21) Appl. No.: 13/186,505

(22) Filed: Jul. 20, 2011

(65) Prior Publication Data

US 2011/0276158 A1 Nov. 10, 2011

Related U.S. Application Data

(62) Division of application No. 11/656,409, filed on Jan. 23, 2007, now Pat. No. 8,019,452.

(30) Foreign Application Priority Data

Jan. 23, 2006 (TW) ............................... 95102518 A

(51) Int. Cl.

| | |
|---|---|
| *G06F 17/00* | (2006.01) |
| *G06F 15/16* | (2006.01) |
| *G06F 3/00* | (2006.01) |
| *G06F 5/00* | (2006.01) |

(52) U.S. Cl.
USPC ............... 700/94; 709/231; 709/233; 710/34; 710/60

(58) Field of Classification Search
USPC .................. 700/94; 725/115; 709/231–234; 710/34, 58, 60
See application file for complete search history.

(56) References Cited

U.S. PATENT DOCUMENTS

| | | | |
|---|---|---|---|
| 5,192,950 | A | 3/1993 | Stephenson, Jr. |
| 5,995,727 | A | 11/1999 | Wise et al. |
| 6,272,569 | B1 | 8/2001 | Nordling |
| 2002/0147849 | A1 | 10/2002 | Wong et al. |
| 2005/0021810 | A1 | 1/2005 | Umemura et al. |

FOREIGN PATENT DOCUMENTS

WO WO 2004/072949 A2 8/2004

*Primary Examiner* — Jesse Elbin
(74) *Attorney, Agent, or Firm* — Bacon & Thomas, PLLC

(57) ABSTRACT

A webcasting system and the audio data regulating methods to be used in the webcasting system are presented. The webcasting system includes a host and an audio playing apparatus. The host, which is loaded with an operating system and drivers, determines the audio data output according to an expected data received by the operating system. The drivers provide the expected data according to the audio data received and transform the audio data for network transmission. The audio playing apparatus receives the network data and processes the network data for audio playing.

10 Claims, 4 Drawing Sheets

AUDIO DATA TRANSMITTING APPARATUS FOR WEBCASTING AND AUDIO REGULATING METHODS THEREFOR

This application is a divisional application of co-pending U.S. application Ser. No. 11/656,409, filed Jan. 23, 2007. This application claims the benefit of Taiwan application Serial No. 95102518, filed Jan. 23, 2006, the subject matter of which is incorporated herein by reference.

BACKGROUND OF THE INVENTION

1. Field of the Invention

The invention relates in general to an audio processing method, and more particularly to an audio regulating method used in network audio playing.

2. Description of the Related Art

When audio is being played in a host having a sound card, a mixing program, such as a core-mixing program of an operating system (KMixer: kernel mixer of Microsoft Windows) is utilized to control the transmission quantity of audio data. After that, a hardware channel interface driver, such as WavePci or WaveCyclic of the miniport driver in Microsoft Windows, receives the audio data transmitted from the mixing program and then outputs the audio data to the sound card for playing the audio. The mixing program provides the quantity of data transmission precisely when the hardware channel interface driver provides the playing position of the audio data. That is, the mixing program can correctly control the transmission quantity per second of the audio data with the data playing position given by the hardware channel interface driver.

However, if audio is broadcasted by way of webcasting, a virtual sound card is utilized to receive the audio data since the host does not have a physical sound card, and the audio data is then transmitted to an audio playing device through the Internet. The hardware channel interface driver can calculate the data quantity of audio data required in a certain period of time according to the time accumulated during this certain period of time. Thus, the mixing program can control the data quantity of audio data transmitted to the hardware channel interface driver for further handling. For example, in a Microsoft operating system, the quantity of data transmission is obtained by using Getposition( ) of the IMiniportWaveCyclicStream or IMiniportWaveCyclicStream interface. In the example of a virtual audio driver, the implementation of Getposition( ) is to get the time difference between the current time and the previous time of calling Getposition( ), in order to get the quantity of audio data transmission. Then, the approximate playing position is calculated according to the format and the transmission rate of the audio data such that the mixing program can refer to and control the quantity of audio data transmission. However, when being used in the network for real time audio playing, the approximate playing position and the error accumulated during multiple calculations will cause unpleasant crackling sounds during real time audio playing.

SUMMARY OF THE INVENTION

The invention is directed to a method of regulating audio data to prevent the crackling sounds caused by the unprecise supply-demand flow of the audio data when the audio is being played.

According to a first aspect of the present invention, an audio data transmitting apparatus is provided. The apparatus includes a storage unit, an output unit and a regulating unit.

The regulating unit includes a first layer program and a second layer program. The first layer program regulates an output quantity of audio data according to expected data. The second layer program calculates a first data quantity of the output quantity of the audio data between a real time instant and a base time instant, calculates a difference between the first data quantity and a second data quantity, transmits the difference back to the first layer program, and transforms the audio data transmitted from the first layer program into virtual audio data. The difference is the expected data, and the second data quantity is the output quantity of the audio data between the previous real time instant and the base time instant. The storage unit stores the virtual audio data. The output unit transforms the virtual audio data into transmissible data with a transmissible format.

According to a second aspect of the present invention, an audio regulating method is provided. The method includes the following steps. First, the method receives audio data. Next, the method regulates an output quantity of the audio data according to expected data. Then, the method calculates a first data quantity of the output quantity of the audio data between a real time instant and a base time instant, calculates a sum of the first data quantity and a second data quantity, and transmits the sum back to a first layer program. An integer part of the sum is the expected data. The base time instant is a previous real time instant. The second data quantity is a fractional part of a previous sum.

The invention will become apparent from the following detailed description of the preferred but non-limiting embodiments. The following description is made with reference to the accompanying drawings.

DETAILED DESCRIPTION OF THE INVENTION

Figure 1:
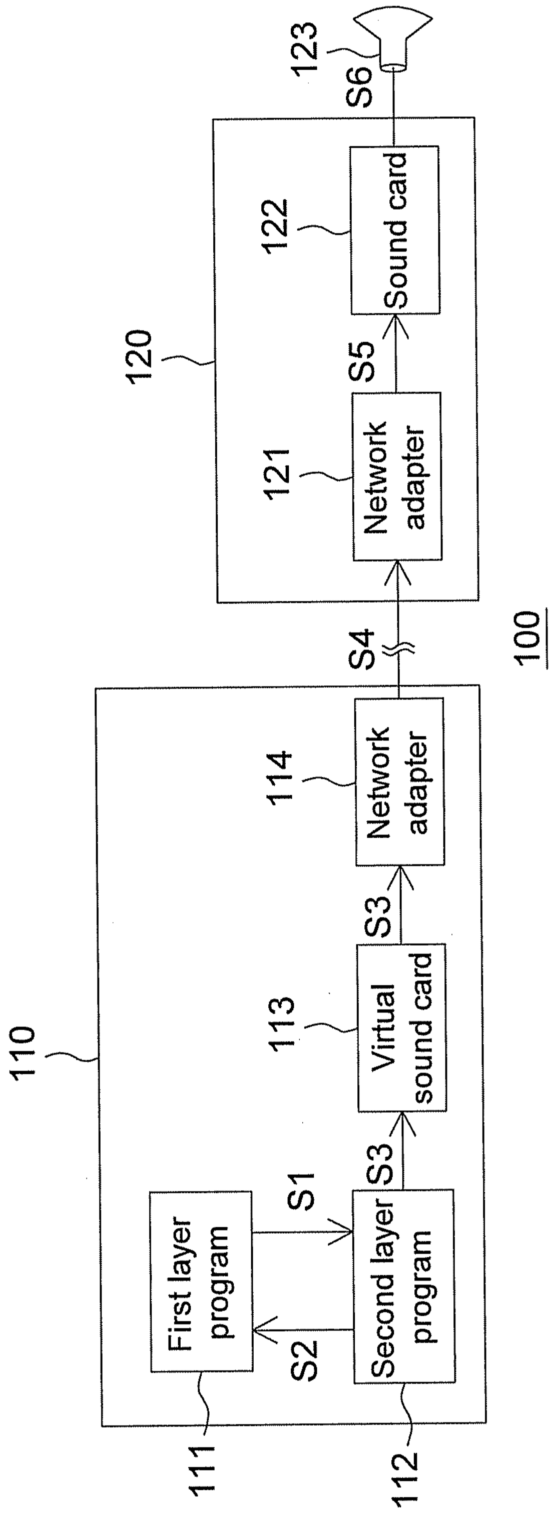
FIG. 1 shows the architecture of a network audio playing system according to an embodiment of the invention.

FIG. 1 shows a webcasting system 100 according to an embodiment of the invention. Referring to FIG. 1, the webcasting system 100 includes an audio data transmitting apparatus 110 and a playing device 120. The audio data transmitting apparatus 110 transforms audio data S1 into network data S4 and outputs the network data S4 to an audio playing apparatus 120, which plays the audio according to the network data S4.

The audio data transmitting apparatus 110 is loaded with a first layer program 111 and a second layer program 112. The second layer program 112 receives the audio data S1 transmitted from the first layer program 111, and then transmits the expected data S2 of the audio data S1 back to the first layer program 111. The first layer program 111 controls the data quantity of the audio data S1 to be outputted to the second layer program 112 according to the expected data S2. The audio data transmitting apparatus 110 runs the second layer, program 112 to transform the outputted audio data S1 into the network data S4.

The first layer program 111 and the second layer program 112 are respectively a core-mixing program and a miniport driver in this embodiment, which are both found in the Microsoft Windows operation system. A sub-program Get-position( ) of the second layer program 112 gets the expected data S2 and then transmits the data S2 back to the first layer program 111 such that the first layer program 111 can control the output data quantity of the audio data S1.

After receiving the audio data S1, the second layer program 112 transforms the audio data S1 into virtual audio data 53 and transmits the virtual audio data S3 to a virtual sound card 113. A network adapter 114 transforms the virtual audio data of the virtual sound card 113 into network data S4 and outputs through the network. The virtual sound card 113 is a storage unit in the audio data transmitting apparatus 110. The network adapter 114 serves as an output unit for transforming the virtual audio data S3 into the network data S4 with a transmissible format and then outputting the network data S4 to the audio playing apparatus 120 through wired or wireless network.

The audio playing apparatus 120 includes a network adapter 121, a sound card 122 and an amplifying speaker 123. The network adapter 121 serves as a receiving unit for receiving the network data S4 through the network and disassembling the packets of the network data S4 into a virtual audio signal S5. Then, the sound card 122 generates playable audio data S6 for the audio playing unit according to the virtual audio signal S5, and the amplifying speaker 123 plays the audio data S6. The sound card 122 of the playing device 120 is a physical sound card.

In order to enable the second layer program 112 to provide the desired transmission data quantity of the audio data S1 for the first layer program 111 during the actual playing procedure to prevent the audio playing apparatus 120 from generating the crackling sounds due to the inconsistency between the audio data quantity and the audio position when the audio is being played at the end of the audio data transmitting apparatus 110, several methods for obtaining the transmission data quantity of the audio data are provided to solve this problem.

Figure 2:
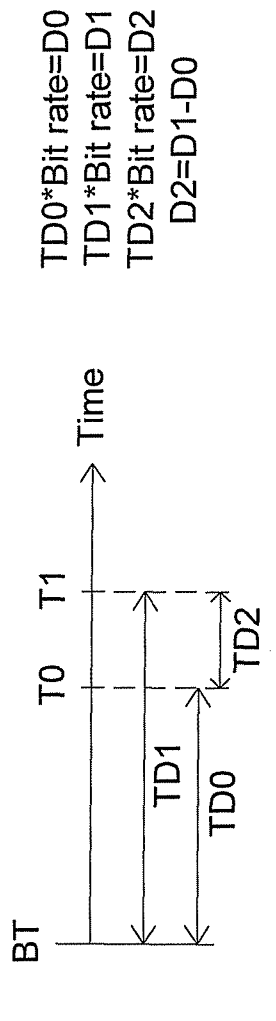
FIG. 2 is a schematic illustration showing time instants for audio data outputting.

FIG. 2 is a schematic illustration showing time instants for audio data outputting. As shown in FIG. 2, when the second layer program 112 is calculating the expected data S2 of the audio data S1, a selected base time instant BT is compared with a real time instant to get the expected data S2 in order to prevent the error in the data quantity. As shown in FIG. 2, the current play time instant is the real time instant T1, and the previous real time instant is T0. The instants T1 and T0 are respectively compared with the base time instant BT, and then the transmission data quantity of the audio data S1 (i.e., the expected data S2) between the real time instant T1 and the previous real time instant T0 can be obtained and transmitted back to the first layer program 111. The previous real time instant T0 is the previous time instant of calculating the transmission data quantity of the audio data S1.

Figure 3:
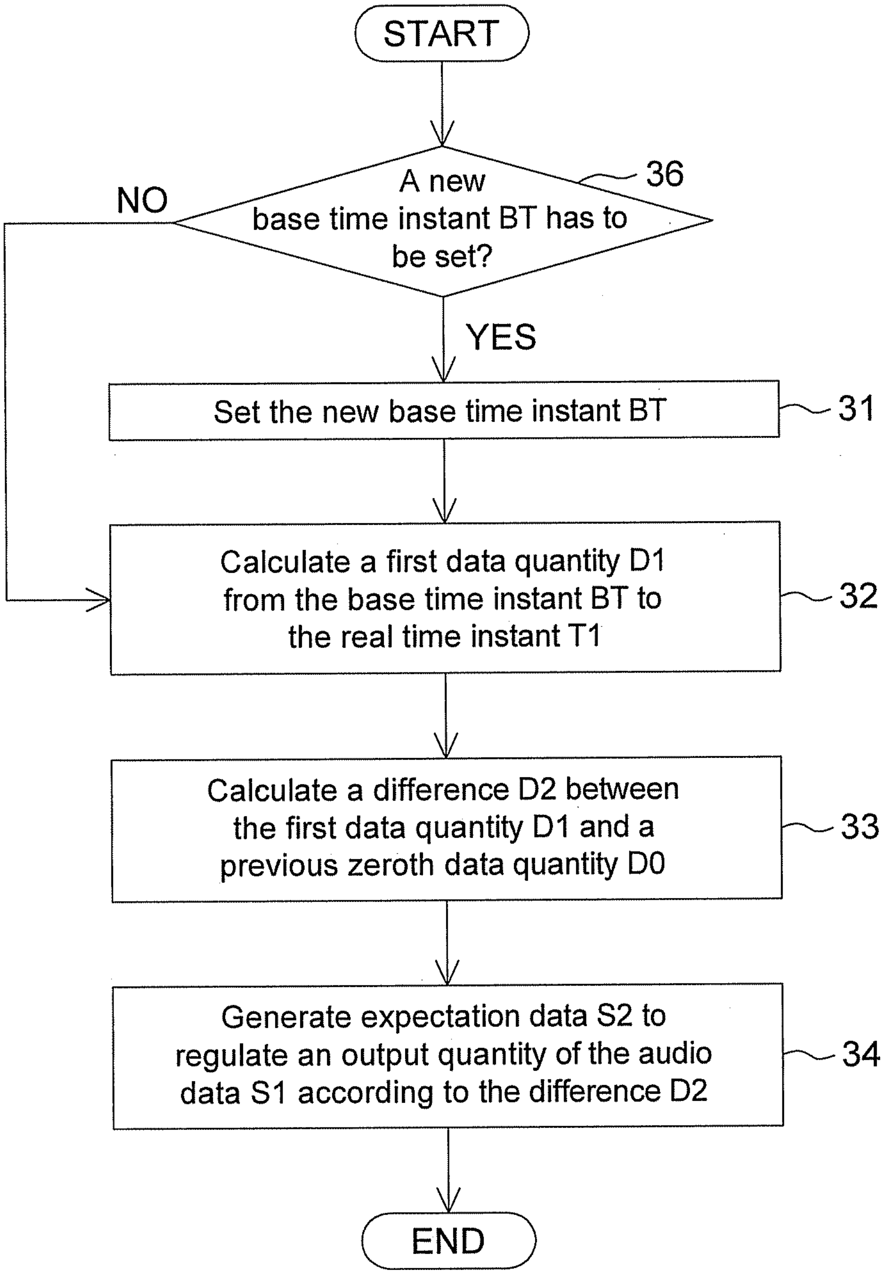
FIG. 3 is a flow chart showing a method of regulating an audio data quantity according to one embodiment of the invention.

Please refer to FIGS. 2 and 3 simultaneously. FIG. 3 is a flow chart showing a method of regulating an audio data quantity according to one embodiment of the invention.

First, step 31 obtains the base time instant BT. Next, as shown in step 32, the first data quantity D1 is calculated according to the time difference TD1 between the real time instant T1 and the base time instant BT, wherein the first data quantity D1 is the transmission data quantity of the audio data S1 between the real time instant T1 and the base time instant BT.

As shown in step 33, the zeroth data quantity D0 is calculated according to the time difference TD0 between the previous real time instant T0 and the base time instant BT, and then the difference (i.e., the second data quantity D2) between the audio data output quantity (i.e., the first data quantity D1) and the previous audio data output quantity (i.e., the zeroth data quantity D0) is obtained.

As shown in step 34, the expected data S2 is generated according to the second data quantity D2 such that the first layer program 111 can regulate the transmission data quantity of the audio data S1 according to the expected data S2.

As shown in FIG. 2, the zeroth data quantity D0, the first data quantity D1 and the second data quantity D2 are respectively obtained by multiplying the time difference TD0, the time difference TD1 and the time difference TD2 by a bitrate in steps 32 and 33.

In this embodiment, the base time instant may be reset after a specific period of time, in order to prevent the prolonged audio playing procedure from causing the overflow problem, as shown in step 36. For example, a new base time instant BT' is set to replace the base time instant BT after a specific period of time, and the expected data S2 is calculated according to the base time instant BT'.

In this embodiment, the expected data S2 is calculated according to the calculation made between the base time instant BT and the real time instant T1. So, the crackling sounds existing in prior art due to approximation of play position resulting from multiple times of error accumulation is avoided.

In another embodiment, the expected data S2 is directly obtained according to the relative time difference between the current time instant and the previous time instant of calculating the transmission data quantity of the audio data S1. The value of the expected data S2 should be an integer in terms of a data unit, such as 1 byte. Thus, this embodiment accumulates and records the remainders of the transmission data quantity that are smaller than one data unit during each calculation, in order to prevent the error accumulation caused by multiple times of skipping the fractional part.

Figure 4:
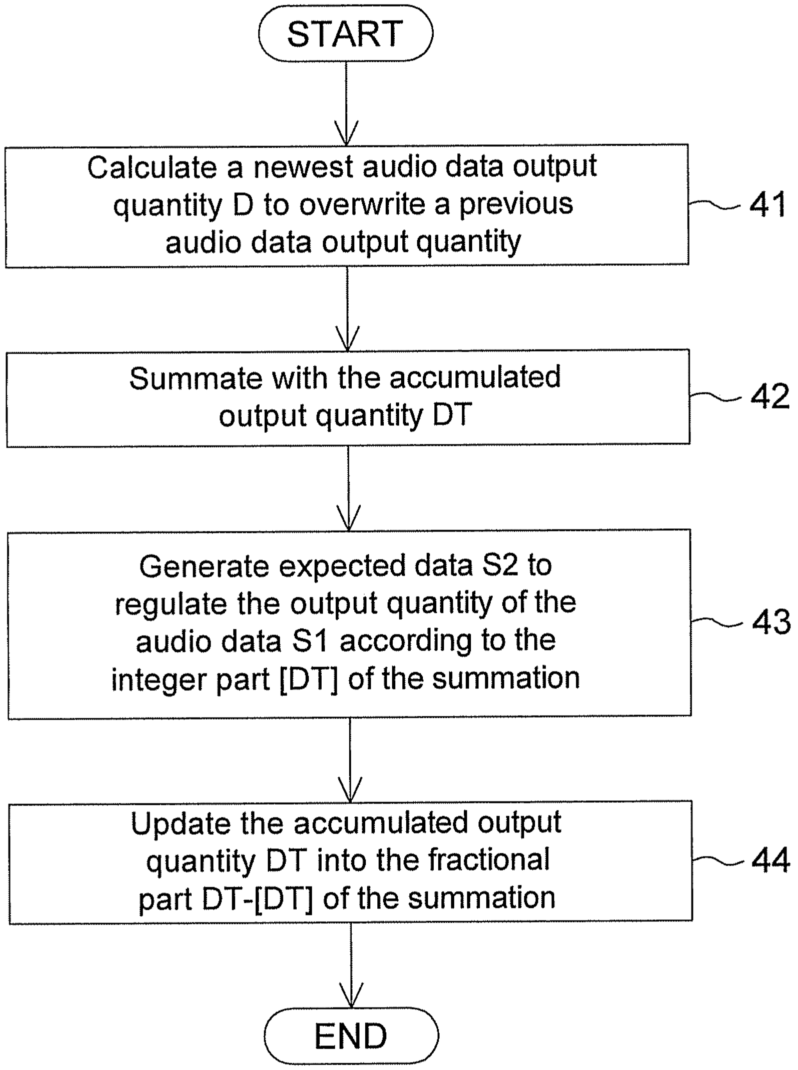
FIG. 4 is a flow chart showing a method of regulating an audio data quantity according to another embodiment of the invention.

FIG. 4 is a flow chart showing a method of regulating an audio data quantity according to another embodiment of the invention. First, as shown in step 41, the newest audio data output quantity D is obtained from the time instant of obtaining the previous audio data output quantity. As shown in FIG. 2, the audio data output quantity D is the quantity of audio data output from the previous real time instant T0 to the real time instant T1. Next, in step 42, the audio data output quantity D obtained in step 41 and the originally accumulated output quantity DT are summated. The accumulated output quantity DT is the fractional part of the audio data output quantity from the base time instant BT to the previous real time instant T0 in FIG. 3. Thereafter, in step 43, the expected data S2 is generated according to the integer part [DT] of the sum to regulate the output of the audio data S1. In step 44, the accumulated output quantity DT is updated to be the fractional part DT-[DT] of the sum repeatedly until the end of the audio is reached.

If the originally newest audio data output quantity D is 2.13244 bytes and the originally accumulated output quantity DT is 0.6 bytes, the sum is 2.73244 bytes. In step 43, the integer part [DT] (=2 bytes) of the sum is taken as the expected data S2. In step 44, the accumulated output quantity DT is recorded as the fractional part DT-[DT] (=0.73244 bytes) of the sum to serve as the reference of accumulation when the expected data S2 is obtained at a next time.

If the originally newest audio data output quantity D is 2.13244 bytes and the originally accumulated output quantity DT is 0.9 bytes, the sum is 3.03244 bytes. In step 43, the integer part [DT] (=3 bytes) of the sum is taken as the expected data S2. In step 44, the accumulated output quantity DT is recorded as the fractional part DT-[DT] (=0.03244 bytes) of the sum to serve as the reference of accumulation when the expected data S2 is obtained at the next time.

According to the webcasting system and the audio regulating method according to the embodiments of the invention, the audio can be played through the network, and it is also possible to control the network audio playing device to play the audio by way of wireless networks. Since the end of the audio data transmitting apparatus can provide the displacement of the audio data precisely, the errors of the data and the play position will not accumulate, and the crackling sounds caused by insufficient data quantity are thus avoided.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An audio data transmitting apparatus for webcasting, comprising:

a regulating unit for receiving audio data, the regulating unit comprising:

a first layer program for regulating an output quantity of the audio data according to expected data; and a second layer program for calculating a first data quantity and a difference between the first data quantity and a second data quantity, transmitting the difference back to the first layer program, and transforming the audio data into virtual audio data, wherein the first data quantity is the output quantity of the audio data between a real time instant and a base time instant, the difference is the expected data, and the second data quantity is the output quantity of the audio data between a previous real time instant and the base time instant; and an output unit, for transforming the virtual audio data into transmissible data with a transmissible format.

2. The apparatus according to claim 1, wherein the audio data transmitting apparatus further comprising:

a virtual sound card, for storing the virtual audio data.

3. The apparatus according to claim 1, wherein the first layer program of the regulating unit is a mixing program of an operating system.

4. The apparatus according to claim 1, wherein the second layer program of the regulating unit is a channel interface driver.

5. The apparatus according to claim 1, wherein the output unit is a wired or a wireless network adapter.

6. An audio regulating method, comprising the steps of:

receiving audio data;

regulating an output quantity of the audio, data according to expected data;

calculating a first data quantity and a difference between the first data quantity and a second data quantity; and transmitting the difference back to a first layer program, wherein the first data quantity is the output quantity of the audio data between a real time instant and a base time instant, the difference is the expected data, and the second data quantity is the output quantity of the audio data between a previous real time instant and the base time instant.

7. The method according to claim 6 further comprising the step of:

transforming the audio data into virtual audio data.

8. The method according to claim 7 is applied in webcasting.

9. The method according to claim 8 runs on an operating system.

10. The method according to claim 9, wherein the first layer program is a mixing program of an operating system.

* * * * *